(12) United States Patent
Shen et al.

(10) Patent No.: US 10,698,967 B2
(45) Date of Patent: Jun. 30, 2020

(54) BUILDING USER PROFILES BY RELEVANCE FEEDBACK

(71) Applicant: Oath Inc., New York, NY (US)

(72) Inventors: Rao Shen, Sunnyvale, CA (US); Akshay Soni, San Jose, CA (US); Troy Chevalier, San Mateo, CA (US); Xue Wu, Sunnyvale, CA (US); Pierce Yang, Sunnyvale, CA (US)

(73) Assignee: Oath Inc., New York, NY (US)

( * ) Notice: Subject to any disclaimer, the term of this patent is extended or adjusted under 35 U.S.C. 154(b) by 225 days.

(21) Appl. No.: 15/831,189

(22) Filed: Dec. 4, 2017

(65) Prior Publication Data

US 2019/0171725 A1 Jun. 6, 2019

(51) Int. Cl.
*G06F 16/9537* (2019.01)
*G06Q 50/00* (2012.01)
*G06F 16/93* (2019.01)
*G06F 16/335* (2019.01)

(52) U.S. Cl.
CPC ........ *G06F 16/9537* (2019.01); *G06F 16/337* (2019.01); *G06F 16/93* (2019.01); *G06Q 50/01* (2013.01)

(58) Field of Classification Search
CPC .... G06F 16/9537; G06F 16/93; G06F 16/337; G06Q 50/01
See application file for complete search history.

(56) References Cited

U.S. PATENT DOCUMENTS

2004/0078363 A1\* 4/2004 Kawatani ................ G06F 16/93
2018/0225379 A1\* 8/2018 Bhadury ................ G06F 16/35

OTHER PUBLICATIONS

Papadogiorgaki, Distributed User Modeling for Personalized News Delivery in Mobile Devices, pp. 80-85 (Year: 2007).\*
Middleton, Capturing knowledge of User Preferences: Ontologies in Recommender Systems, pp. 100-107 (Year: 2001).\*
Carbone, Auto-Scoring of Personalised News in the Real-Time Web: Challenges, Overview and Evaluation of the State-of-the-Art Solutions, pp. 169-180 (Year: 2015).\*

\* cited by examiner

*Primary Examiner* — Albert M Phillips, III
(74) *Attorney, Agent, or Firm* — Cooper Legal Group, LLC

(57) ABSTRACT

A method is provided, including: detecting interactions by a plurality of users with a plurality of content items, each content item having an associated content item vector; for a given user, identifying interactions occurring during a current time period, including identifying positive interactions with a first set of the content items, and negative interactions with a second set of the content items; processing a first set of the content item vectors that are associated with the first set of the content items to determine a positive interaction vector; processing a second set of the content item vectors that are associated to the second set of the content items to determine a negative interaction vector; for the given user, generating a current user profile vector for the current time period, using the positive interaction vector, the negative interaction vector, and a prior user profile vector for a prior time period.

20 Claims, 6 Drawing Sheets

BUILDING USER PROFILES BY RELEVANCE FEEDBACK

BACKGROUND

1. Field of the Disclosure

The present disclosure relates to methods and systems for building user profiles by relevance feedback.

2. Description of the Related Art

Online news services have dramatically changed the way people access information. Due to the great number of news sites accessible over the Web, it is problematic for normal end users to reach the desired pieces of information as quickly as possible. Users expect to be provided with content that they consider relevant, useful, or interesting. Since every single user has his/her own set of interests, personalization of presented news results is an important objective for serving end users. The ability to deliver personalized content is crucial to content platforms such as Yahoo!® News, Youtube®, Facebook®, etc.

Traditional approaches consist of ranking news articles based on how well they match the user's interests. Determining the interests of a specific user (i.e., building a user profile) is a critical aspect that heavily affects the quality of a news personalization system. While early systems explicitly asked users to specify their profiles, it is common today to develop automated user-profiling strategies that do not require any manual effort on the part of users. One of the most valuable information sources that can be used to automatically build user profiles is the online behavior exhibited by users during their interaction with online services.

It is in this context that implementations of the disclosure arise.

SUMMARY

Implementations of the present disclosure provide methods and systems for building user profiles by relevance feedback.

The modeling of user interest profiles is a key component of a content recommendation system. A user profile can be built using the features of the content items that the user has interacted with. Examples of content features for news items can be topics of news articles. The feature space of the user profile is then the same as the space of content features and a given feature value in the user profile indicates the relevance of the content feature to the user. At the time of serving content items to users, the relevance between a user and a given content item can be measured based on the similarity between the user's profile and the content features of the given content item.

An intuitive solution to building profiles is to combine all features of items clicked by the user using certain statistical models. This is based on the assumption that if a user interacts a lot with content items containing a specific feature, that feature may be highly relevant to this user and the user is likely to read other items that contain the feature as well. A user interest profile can then be represented as a vector over content features.

Another statistical method is derived from the Chi-Square test. The concept is to select those features which have much higher values for the user as compared to the expected value. This means that if one user reads items containing a specific feature at a rate that is statistically significantly above the average rate for that feature, that feature will be included in the user interest profile.

While generative statistical models are intuitive and easy to compute, these methods only use positive feedback signals. By not taking into account features appearing in content items with negative feedback, such user profiles can misrepresent the relevance of the feature to the user. In other words, these models lack the ability to represent discriminative user interests.

Thus, in order to quickly build user profiles that contain discriminative user interest features, implementations of the present disclosure model a users' interest using both positive and negative feedback on items. More specifically, in some implementations, the history of click or skip feedback for each user on displayed items is used to construct the training data for that user, where each item is a feature vector with labels, click or skip. Furthermore, time-decay factors are taken into account so that the system can keep track of changes in the users' interest. Changes in the feature (topic) values in the user profile indicate that the relevance of topics to the user is changing. New features (topics) can be added into the user profile, and old topics can also be removed based on the user's interactions with the content items.

In accordance with implementations of the disclosure, an approach to building user profiles is summarized below. A special version of such a method is analogous to the Rocchio algorithm, which is used to refine a user query based on retrieved documents in information retrieval.

As discussed above, a profile model needs to capture time-varying user's interest and build user profiles precisely and quickly.

Generally, user profile modeling in a content recommendation system aims to represent user interests in the same space as that of the content features in order to effectively retrieve content items that are relevant to the user. The user profiling problem can be formally defined as follows:

A user profile $P_t$ at time t is a function $f$ that maps the user profile $P_{t-1}$ created at time t−1 and the clicks and skips observed at time t, click(t) and skip(t). To build an initial user profile, only click(t) and skip(t) are used.

$$P_t = f(P_{t-1}, \text{click}(t), \text{skip}(t))$$

Function $f$ can be learned from the user's current profile and the history of the user's behavior. It can be expressed in different models and may be a linear function, which turns out to be analogous to the Rocchio algorithm.

Using the generative statistical model described before as a base line, experiments using such a linear function demonstrated performance better than the baseline by over 7%.

The Rocchio algorithm is a relevance feedback procedure used in information retrieval. It designed to produce improved query formulations following an initial retrieval operation. The Rocchio feedback approach was developed using the Vector Space Model. The algorithm is based on the assumption that most users have a general conception of which documents should be denoted as relevant or non-relevant. By using the Rocchio algorithm, the original query is moved closer to the centroid of relevant documents and away from the centroid of non-relevant documents. The importance of relevant and non-relevant documents allowed to refine a query is dictated by the weights of the alpha, beta, and gamma variables described below. A method analogous to the Rocchio algorithm is used in some implementations of the present disclosure to model user profiles based on user relevance feedback.

$$P_t = \text{alpha}*P_{t-1} + \text{beta}*\text{Mean}(\text{relevant}(t)) + \text{gamma}*\text{Mean}(\text{nonrelevant}(t))$$

As demonstrated in the Rocchio formula, the associated weights (alpha, beta, and gamma) are responsible for shaping the modified user profile vector in a direction closer, or farther away, from the original profile, related documents, and non-related documents.

User profiles ($P_t$ and $P_{t-1}$), relevant documents, relevant (t), and non-relevant documents, nonrelevant(t)), are all modeled as vectors in the same concept space. Relevant documents are those for which users showed interest (e.g. clicked documents), while non-relevant documents are those which users skipped. Mean(relevant(t)) and Mean(nonrelevant(t)) are the centroids of the relevant document vectors and non-relevant document vectors, respectively.

The inner product between user profiles and item features is used to obtain the relevance score for the ranking model. To guarantee efficiency the values of alpha, beta, and gamma can be optimized to achieve the best ranking of documents for a given objective for a given user profile.

Implementations of the present disclosure provide several advantages over prior art methods. The approach taken is generic and has broad applicability to content recommendation and personalization of many products such as the various Yahoo! properties. Since in some implementations, the model update only relies on count data, it is easily scalable to run at web-scale. The model tracks the time-varying nature of user interest, capturing changes in user's interest with time.

In some implementations, a method implemented by at least one server computer is provided, including: detecting interactions by a plurality of users with a plurality of content items, the content items being provided over a network in response to user requests received over the network, each content item having an associated content item vector that defines values indicating relevance of the content item to each of a plurality of entities; for a given user, identifying interactions occurring during a current time period, including identifying positive interactions indicating engagement by the given user with a first set of the content items, and negative interactions indicating lack of engagement by the given user with a second set of the content items; processing a first set of the content item vectors that are associated with the first set of the content items to determine a positive interaction vector; processing a second set of the content item vectors that are associated to the second set of the content items to determine a negative interaction vector; for the given user, generating a current user profile vector for the current time period, using the positive interaction vector, the negative interaction vector, and a prior user profile vector for a prior time period; wherein the current and prior user profile vectors each define values indicating levels of interest by the given user with respect to each of the entities.

In some implementations, processing the first set of the content item vectors to determine the positive interaction vector includes determining a mean of the first set of the content item vectors; wherein processing the second set of the content item vectors to determine the negative interaction vector includes determining a mean of the second set of the content item vectors.

In some implementations, generating the current user profile vector includes applying weights to each of the positive interaction vector, the negative interaction vector, and the prior user profile vector.

In some implementations, the weight applied to the prior user profile vector has a value less than one.

In some implementations, the weight applied to the prior user profile defines a time decay of the prior user profile vector.

In some implementations, the positive interactions include clicks and/or dwell times that meet or exceed a predefined threshold.

In some implementations, the negative interactions include skips and/or dwell times that are less than a predefined threshold.

In some implementations, the content items include one or more of previews, articles, videos, images.

In some implementations, the current time period is defined by an amount of time in the range of about 1 to 30 days; wherein the prior time period is defined by an amount of time equivalent to that of the current time period, that immediately precedes the current time period.

In some implementations, the content item vectors, the positive and negative interaction vectors, and the current and prior user profile vectors, each have a dimension that is defined by a number of the plurality of entities.

In some implementations, the number of the plurality of entities is greater than one thousand entities.

In some implementations, a non-transitory computer readable medium having program instructions embodied thereon, the program instructions being configured, when executed by a computing device, to cause the computing device to perform the following operations: detecting interactions by a plurality of users with a plurality of content items, the content items being provided over a network in response to user requests received over the network, each content item having an associated content item vector that defines values indicating relevance of the content item to each of a plurality of entities; for a given user, identifying interactions occurring during a current time period, including identifying positive interactions indicating engagement by the given user with a first set of the content items, and negative interactions indicating lack of engagement by the given user with a second set of the content items; processing a first set of the content item vectors that are associated with the first set of the content items to determine a positive interaction vector; processing a second set of the content item vectors that are associated to the second set of the content items to determine a negative interaction vector; for the given user, generating a current user profile vector for the current time period, using the positive interaction vector, the negative interaction vector, and a prior user profile vector for a prior time period; wherein the current and prior user profile vectors each define values indicating levels of interest by the given user with respect to each of the entities.

In some implementations, a system including at least one server computer is provided, the at least one server computer having: logic configured to detect interactions by a plurality of users with a plurality of content items, the content items being provided over a network in response to user requests received over the network, each content item having an associated content item vector that defines values indicating relevance of the content item to each of a plurality of entities; logic configured to, for a given user, identify interactions occurring during a current time period, including identifying positive interactions indicating engagement by the given user with a first set of the content items, and negative interactions indicating lack of engagement by the given user with a second set of the content items; logic configured to process a first set of the content item vectors that are associated with the first set of the content items to determine a positive interaction vector; logic configured to process a second set of the content item vectors that are associated to the second set of the content items to determine a negative interaction vector; logic configured to, for the given user, generating a current user profile vector for the current time period, using the positive interaction vector, the negative interaction vector, and a prior user profile vector for a prior time period; wherein the current and prior user profile vectors each define values indicating levels of interest by the given user with respect to each of the entities.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
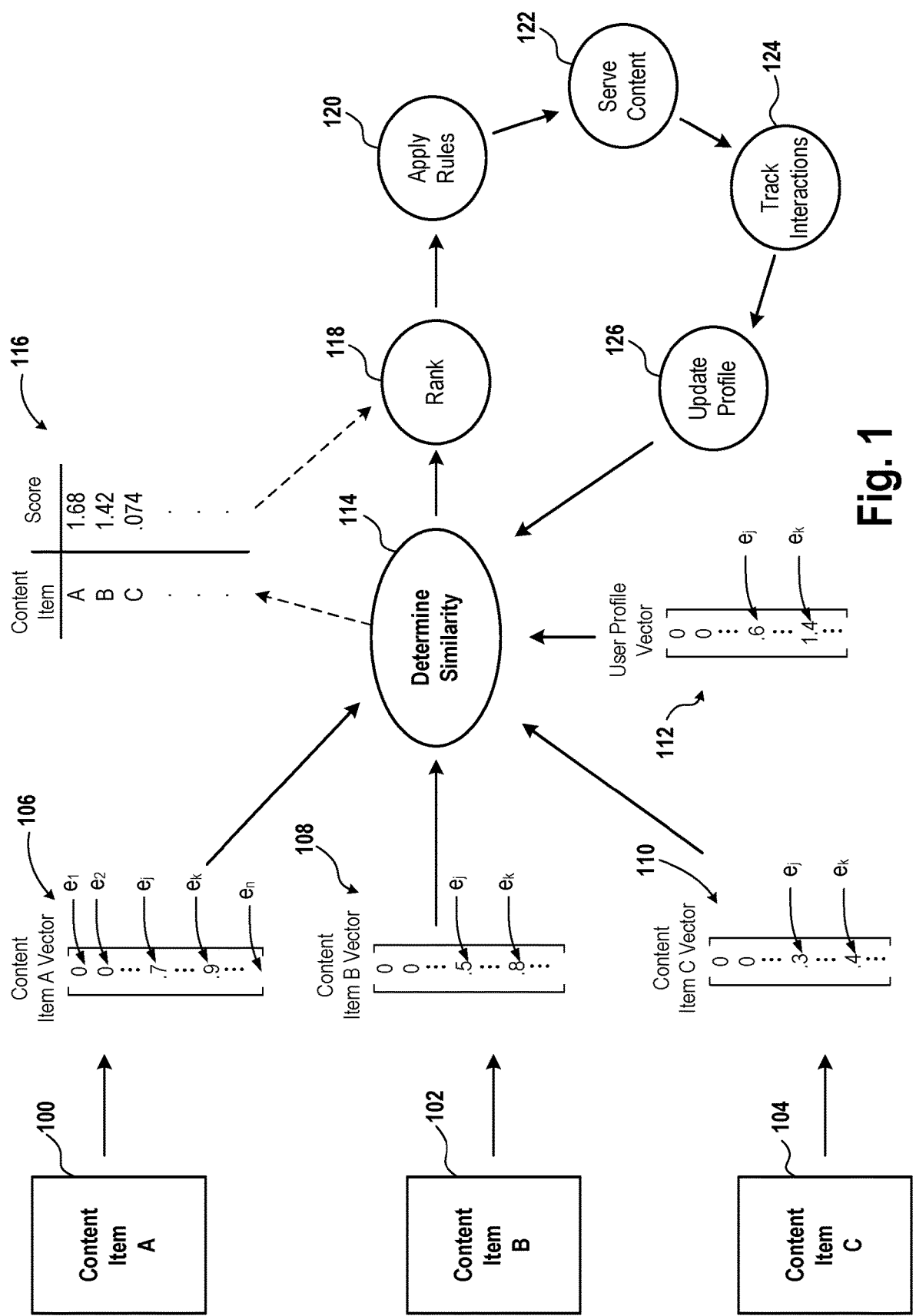
FIG. 1 conceptually illustrates a process for serving content items to a user based on the user's profile, in accordance with implementations of the disclosure.

The following implementations describe systems and methods for building user profiles using relevance feedback. It will be obvious, however, to one skilled in the art, that the present disclosure may be practiced without some or all of these specific details. In other instances, well known process operations have not been described in detail in order not to unnecessarily obscure the present disclosure.

Subject matter will now be described more fully hereinafter with reference to the accompanying drawings, which form a part hereof, and which show, by way of illustration, specific example implementations. Subject matter may, however, be embodied in a variety of different forms and, therefore, covered or claimed subject matter is intended to be construed as not being limited to any example implementations set forth herein; example implementations are provided merely to be illustrative. Likewise, a reasonably broad scope for claimed or covered subject matter is intended. Among other things, for example, subject matter may be embodied as methods, devices, components, or systems. Accordingly, implementations may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one implementation" as used herein does not necessarily refer to the same implementation and the phrase "in another implementation" as used herein does not necessarily refer to a different implementation. It is intended, for example, that claimed subject matter include combinations of example implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Disclosed herein is a novel approach for building user profiles based on the user's feedback in relation to content items. The feedback can be explicit, e.g. in the form of ratings or binary preference indicators, or implicit, e.g. inferred from the user's interaction with the content item. As with explicit interest declarations, assuming the presence of explicit feedback is not always feasible. On the other hand, there is a rich set of implicit feedback that can be obtained from the user's behavior in relation to a content item. As an example, a user can indicate a positive preference by clicking on an item or dwelling on it beyond a threshold amount of time, while negative feedback can be inferred/construed from a lack of a click or very low time spent on an item (e.g. less than a threshold amount of time). Given the user feedback on a set of content items, it is possible to characterize or build a profile for the user.

An advantage of building such user interest profiles is that such a method suffers less from the item cold-start case. That is, even if the user is the very first person to interact with that item, it can be deemed relevant to the user based on an overlap in the user interest profile and the item's features. Examples of content features for news items can include topics of the content item. Such profile building methods can be built from a combination of explicit, implicit, positive and/or negative feedback from the user. However, there are also several challenges to building an effective user profile in an expedient manner.

For example, there can be multiple types of user feedback interactions occurring between users and items that go beyond clicks. Users may show interest in a topic in one item while skipping the same topic in other items. In particular, signals that can be considered as negative feedback of the users are of great value, since they improve the discriminative ability of user profiles. Very few content personalization solutions explicitly model the wealth of information in implicit negative feedback from users. Hence, one challenge is how to effectively exploit the complex implicit feedback data for modeling user profiles.

The time-varying nature of a user's interest also presents challenges. A user's interest may change based on contextual information. A user may have different topical interests on weekdays versus weekends. She may change her interest according to seasonal events. To capture users' interests precisely and quickly, implementations of the disclosure consider a time-decay factor.

Another challenge is scalability. Personalized recommendation is by default a task at very large scale, since online companies may serve millions of users and items every day. In addition, the content features, based on which the user profiles are built, likely lie in a very high dimensional space, e.g., documents can be represented by thousands of topics. As a result, building profiles for individual users requires computation over a massive feature space. Furthermore, in order to stay current with the user's time-varying interests as noted above, users' profiles should be periodically updated or re-determined within short timeframes, thereby magnifying the scalability issue. In sum, it is challenging to provide a computationally efficient method of building user profiles that also fulfills the goals of high personalization (and discriminative utility) and time sensitivity.

Implementations of the present disclosure provide solutions to the aforementioned challenges and address the drawbacks of prior art approaches. In some implementations, a specialized case of the presently described approach uses the Rocchio algorithm, which is a relevance feedback procedure used in information retrieval. Implementations of the present disclosure make use of relevance feedback to build user profiles that can then be used to retrieve relevant content items for the user. Unlike conventional approaches that only build user profiles based on positive implicit feedback such as click events, implementations of the present disclosure exploit the rich and complex signals that are present in the negative feedback of users with respect to content items. By incorporating both positive and negative user feedback and a time-decay factor, it is possible to build user interest profiles that are discriminative and more effective than conventional approaches.

FIG. 1 conceptually illustrates a process for serving content items to a user based on the user's profile, in accordance with implementations of the disclosure. Broadly speaking, implementations of the disclosure relate to a content recommendation system that recommends content items to users based on their user profiles, and further updates their user profiles based on both positive and negative feedback on the content items which have been provided to the users. A content item can be any type or unit of content that can be provided over a network, and rendered on a client device operated by the user. Examples of content items include by way of example without limitation, articles (e.g. news, editorials, non-fiction, fiction, etc.), videos, images, audio, advertisements, and any other type of content that can be transmitted over a network for consumption by an end user. Content items may also include previews of such content, and in some implementations, a given content item and its preview may be used and/or considered interchangeably, as for example, an interaction with a preview of a content item can be considered as an interaction with the content item for purposes of determining/updating the user profile in accordance with implementations of the disclosure.

In the illustrated implementation, content items A, B, and C (refs. 100, 102, 104, respectively) are conceptually illustrated. It will be appreciated that there may be any number of content items in various implementations. In a content recommendation system such as a news recommendation system, there can be thousands or even hundreds of thousands of content items, by way of example without limitation. Each content item has an associated content item vector. In the illustrated implementation, the content item A has a content item A vector (ref. 106), the content item B has a content item B vector (ref. 108), the content item C has a content item C vector (ref. 110). A given content item vector define values indicating the relevance of a given content item to various entities. Examples of entities include any topics, persons, places, things, events, tags, keywords, etc. That is, entities are any subject to which a given content item may be relevant. In some implementations, a corpus of entities can be used to define the available entities which are represented by a vector. Examples include by way of example without limitation, Wikipedia entities, the Yahoo! Content Taxonomy, etc. It will be appreciated that the number of possible entities defines the dimensional size of the vector space in which the content items are given vector representations (content item vectors). That is, in some implementations, the dimension of the content item vectors is defined by the number of possible entities. There can be any number of possible entities in various implementations. In some implementations, the dimension of a given content item vector is greater than one thousand; in some implementations, greater than 100,000. In some implementations, the dimension of a given content item vector is on the order of approximately 400,000.

With continued reference to FIG. 1, in the illustrated implementation, the content item A vector includes fields for entities $e_1$ to $e_n$. The values for a given entity indicates the relevance of the given content item to that given entity (e.g. the extent to which the given content item is "about" the given entity). In some implementations, a value of zero indicates no relevance, and increasingly positive values indicate increasing amounts of relevance. In some implementations, the values for most entity fields is likely to be zero, and therefore, in some implementations, content item vectors are stored in a manner such that only the positive entity values are stored, and the remaining field values need not be specifically stored, as they are known to be zero, which can be determined and/or generated when needed for processing.

In some implementations, the specific vector encoding for a given content item can be determined using machine learning methods. Examples of methods for encoding the vector representations of content items are described, by way of example without limitation, in U.S. patent application Ser. No. 15/471,455, filed Mar. 28, 2017, entitled "Multilabel Learning Via Supervised Joint Embedding of Documents and Labels," the disclosure of which is incorporated by reference herein.

In the illustrated implementation, the content item A vector defines a value of 0.7 for entity $e_j$, and a value of 0.9 for entity $e_k$; the content item B vector defines a value of 0.5 for entity $e_j$, and a value of 0.8 for entity $e_k$; the content item C vector defines a value of 0.3 for entity $e_j$, and a value of 0.4 for entity $e_k$.

For a given user, a user profile vector (ref. 112) is defined, that is encoded in the same vector space as the content item vectors. That is, the user profile vector has the same dimensionality and defines values for the same set of entities as the content item vectors. However, the values defined by the user profile vector indicate the relevance of the entities to the given user (or rather, the relative amounts of preference or interest of the user in the various entities).

To determine the (expected) relevance of a given content item to the user, the similarity of the content item's vector representation to the user profile vector is determined (ref. 114). In some implementations, this is performed by determining the inner product of the content item's vector and the user profile vector to arrive at a relevance score. In the illustrated implementation, the inner product of the user profile vector (ref. 112) and each of the content item A/B/C vectors yields the relevance scores for the content items A, B and C as shown at ref. 116.

The relevance scores can be used to rank the content items according to relevance to the user. In the illustrated implementation, a higher score indicates greater relevance to the user. Based on the content items' rankings, one or more of the content items are presented to the user (ref. 122), e.g. by transmitting the one or more content items over a network to the client device for rendering thereon. In some implementations, the highest ranking content items are presented to the user. In some implementations, the ranking of the content items is used to determine the order in which the content items are presented to the user.

In some implementations, factors in addition to the ranked order of the content items are considered before serving content items. For example, in some implementations, one or more rules are applied (ref. 120), e.g. to affect/alter the rankings or supersede the rankings, before content items are served. By way of example without limitation, there may be a rule to prevent too many content items of a same or similar type (e.g. as determined from their respective vector representations) from being presented at the same time or in rapid succession, a rule to insert a specific content item at a particular location and/or time, etc.

After the selected content items are served to the user, then the user's interactions with the selected content items are tracked (ref. 124). The tracked interactions can be processed as positive feedback, indicating relevance of the content item and its associated entities to the user, and negative feedback, indicating non-relevance of the content item and its associated entities to the user. This information can be used to update the user's profile vector (ref. 126), as described in further detail below. It will be appreciated that the updated user profile is then utilized for subsequent similarity and ranking operations to determine which content items will be served to the user in the future.

Figure 2:
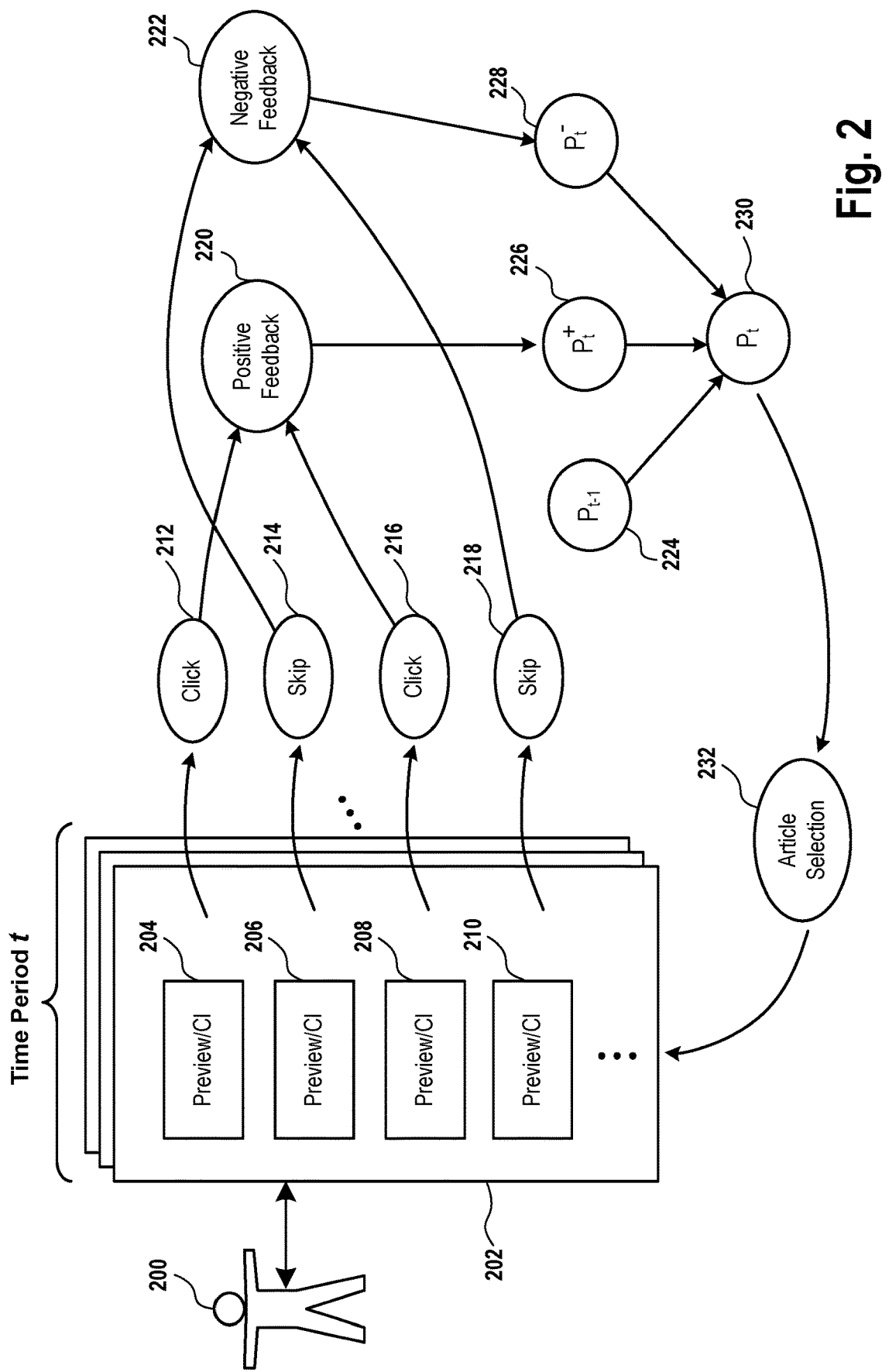
FIG. 2 conceptually illustrates a process for determining a user profile, in accordance with implementations of the disclosure.

FIG. 2 conceptually illustrates a process for determining a user profile, in accordance with implementations of the disclosure. In the illustrated implementation, the user 200 interacts with content items over a current time period t, that are presented through a content presentation context 202. The content presentation context 202 is any kind of context or vehicle through which the content items can be presented to the user. Examples include, by way of example without limitation, a web page, an application/app, a social media feed, a news feed, etc.

In the illustrated implementation, the user 200 interacts with the content items 204, 206, 208, and 210. As shown, the user clicks on content items 204 and 208. These click interactions (ref. 212 and 216) are registered as positive feedback/interactions on the content items 204 and 208. Whereas the user skips content items 206 and 210. These skip interactions (ref. 214 and 218) are registered as negative feedback/interactions on the content items 206 and 210.

It will be appreciated that in some implementations, the content items are previews, which when clicked, cause presentation of the full versions of their respective content items.

The positive interactions are encoded into a positive interaction vector $P_t^+$ (ref. 226). In some implementations, this is performed by determining the mean of the content item vectors for the content items that received positive interactions (e.g. clicks) during the time period t. Similarly, the negative interactions are encoded into a negative interaction vector $P_t^-$ (ref. 228). In some implementations, this is performed by determining the mean of the content item vectors for the content items that received negative interactions (e.g. skips) during the time period t.

In some implementations, if positive interactions (e.g. clicks, dwell time greater than or equal to a predefined threshold, etc.) are recorded for m content items having corresponding vectors $V_i$, then the positive interaction vector $P_t^+$ can be calculated as follows:

$$P_t^+ = \frac{1}{m}\sum_{i=1}^{m} V_i$$

Conceptually, this can be understood as determining the centroid of the vector representations of the content items for which the user exhibited positive interactions.

Similarly, in some implementations, if negative interactions (e.g. skips, dwell time less than or equal to a predefined threshold, etc.) are recorded for n content items having corresponding vectors W, then the negative interaction vector $P_t^-$ can be calculated as follows:

$$P_t^- = \frac{1}{n}\sum_{i=1}^{n} W_i$$

Conceptually, this can be understood as determining the centroid of the vector representations of the content items for which the user exhibited negative interactions.

In view of the above, an updated user profile vector can be determined as a function of the previous user profile vector $P_{t-1}$ from a preceding time period t−1, the positive interactions as represented by the positive interaction vector, and the negative interactions as represented by the negative interaction vector. In some implementations, the updated user profile vector for the current time period t is determined as follows:

$$P_t = f(P_{t-1}, P_t^+, P_t^-)$$

It will be appreciated that the function $f$ can take various forms. In some implementations, the function $f$ is learned from the user's current profile and the history of the user's behavior. In some implementations, the updated user profile vector $P_t$ is determined according to a linear function as follows:

$$P_t = \alpha(P_{t-1}) + \beta(P_t^+) + \gamma(P_t^-)$$

The parameters $\alpha$, $\beta$, and $\gamma$ are tuning parameters/weights that can be tuned to determine the extent to which the updated user profile is determined by each of the previous profile vector, the positive interaction vector, and the negative interaction vector.

The parameter $\alpha$ has a value between zero and one, and determines the extent to which the previous user profile vector influences the current user profile vector. Furthermore, by setting the parameter $\alpha$ to a value between zero and 1, the parameter $\alpha$ also controls the decay of the influence of a previous user profile vector for purposes of determining a current user profile vector. That is, as the parameter $\alpha$ decreases, so the influence of the previous profile vector is not only reduced for purposes of determining the updated profile vector, but also increases the rate of decay of the previous profile vector's influence in subsequent profile updates. This can be conceptually understood when considering that for a future time period t+1, the user profile is determined as follows:

$$P_{t+1} = \alpha(P_t) + \beta(P_{t+1}^+) + \gamma(P_{t+1}^-)$$
$$= \alpha(\alpha(P_{t-1}) + \beta(P_t^+) + \gamma(P_t^-)) + \beta(P_{t+1}^+) + \gamma(P_{t+1}^-)$$
$$= \alpha^2(P_{t-1}) + \alpha\beta(P_t^+) + \alpha\gamma(P_t^-) + \beta(P_{t+1}^+) + \gamma(P_{t+1}^-)$$

Thus, it can be seen that whereas the influence of the previous user profile vector $P_{t-1}$ is defined by $\alpha$ at time t, it is defined by $\alpha^2$ at time t+1, by $\alpha^3$ at time t+2, and so forth. Thus, there is an exponential decay of the previous user profile vector that is defined by parameter $\alpha$.

The parameters $\beta$ and $\gamma$ determine the influence of the positive and negative interaction vectors, respectively, on determining the updated user profile vector. In other words, they determine the extent to which the updated user profile is determined by the positive and negative interactions occurring during the current time period t. The parameter $\beta$ will have a positive value that enables additive emphasis of features of content items with which positive interactions were recorded. However, the parameter $\gamma$ will have a negative value, so as to de-emphasize features of content items with which negative interactions were recorded.

In various implementations, the time period t can define any period of time, including by way of example without limitation, one or more days, one or more weeks, one or more months, etc. It will be appreciated that the time period defines how often the user profile is updated. In some implementations, the time period t is defined by recording of a predefined number of interactions (positive or negative) with content items. In this manner, then the user profile is not updated until a sufficient number of interactions has been recorded since the last time the user profile was updated.

While implementations have been described with reference to clicks and skips as types of positive and negative interactions, it will be appreciated that in other implementations, positive interactions may include any type of interaction with a content item that indicates its relevance to the user, and negative interactions may include any type of interaction with a content item that indicates its non-relevance to the user. In some implementations, positive interactions include dwell time (time spent by a user viewing a given content item) greater than (or equal to) a predefined threshold, and negative interactions include dwell time less than (or equal to) a predefined threshold. Other examples of positive interactions can include social signals such as commenting on a content item, sharing of a content item (e.g. over a social network), indicating a reaction to a content item on a social network (e.g. thumbs up, like, etc.), and other types of interactions that indicate user engagement with a content item.

In some implementations, the specific values of the parameters $\alpha$, $\beta$, and $\gamma$ can be optimized for one or more goals, such as maximizing user engagement (e.g. maximizing dwell time, and/or other positive interaction indicators), maximizing revenue (e.g. generated from advertising), etc. In some implementations, the values of the parameters $\alpha$, $\beta$, and $\gamma$ can be optimized/determined using a machine learning technique (e.g. a neural network, etc.).

It will be appreciated that initially, there may be no previous user profile vector for a brand new user. In this case, then the first user profile vector will be determined by only the positive and negative interaction vectors, which are determined from the positive and negative interactions occurring over the current time period. After this first user profile vector is determined, then it is used to determine a subsequent user profile vector in a subsequent time period, per the above.

In some implementations, the value of the parameter $\alpha$ is in the range of about 0.5 to 0.9; in some implementations, a is in the range of about 0.7 to 0.9; in some implementations, a is approximately 0.8.

In some implementations, the value of the parameter $\beta$ is in the range of about 0.5 to 1.5; in some implementations, $\beta$ is in the range of about 0.7 to 1.2; in some implementations, $\beta$ is approximately 1.0.

In some implementations, the value of the parameter $\gamma$ is in the range of about −1.5 to −0.5; in some implementations, $\gamma$ is in the range of about −1.2 to −0.7; in some implementations, $\gamma$ is approximately −0.9.

Figure 3:
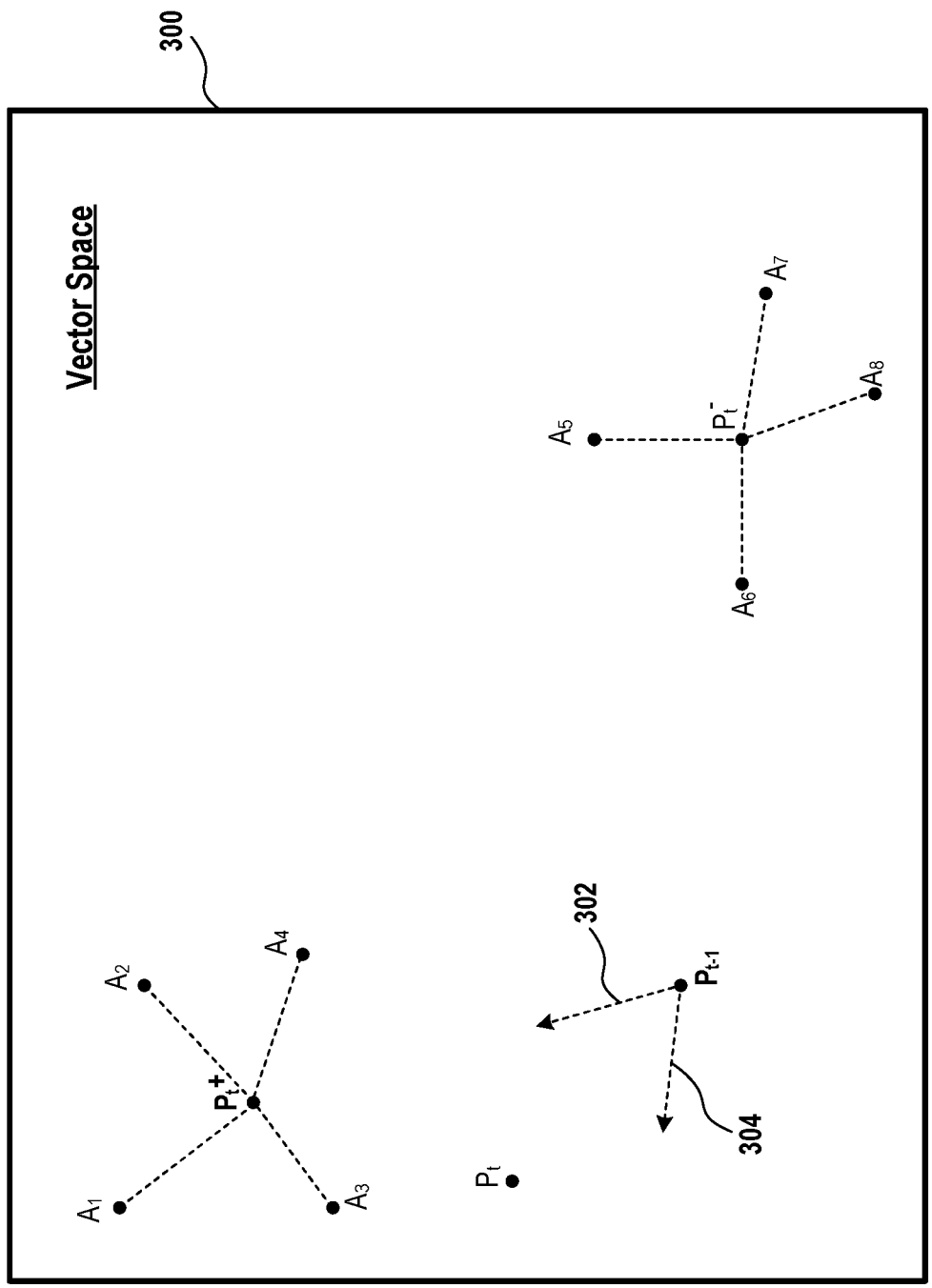
FIG. 3 conceptually illustrates determination of a user profile vector in a vector space, in accordance with implementations of the disclosure.

FIG. 3 conceptually illustrates determination of a user profile vector in a vector space, in accordance with implementations of the disclosure. In the illustrated implementation, a vector space 300 is shown, in which content item vectors are defined. During a current time period t, a given user exhibits positive interactions with content items having vector representations $A_1$, $A_2$, $A_3$, and $A_4$, and the given user exhibits negative interactions with content items having vector representations $A_5$, $A_6$, $A_7$, and $A_8$. The positive interaction vector $P_t^+$ is determined as the centroid of the content item vectors $A_1$, $A_2$, $A_3$, and $A_4$. The negative interaction vector $P_t^-$ is determined as the centroid of the content item vectors $A_5$, $A_6$, $A_7$, and $A_8$.

The user also has a previous user profile vector $P_{t-1}$ from a previous time period t−1. In order to update the user profile vector for the current time period t, the previous user profile vector $P_{t-1}$, the positive interaction vector $P_t^+$, and the negative interaction vector $P_t^-$ are combined to adjust the user profile vector so that it moves towards the centroid of the content items with which the user exhibited positive interactions (ref. 302), and moves away from the centroid of the content items with which the user exhibited negative interactions (ref. 304), to define the current user profile vector $P_t$ for the current time period.

Figure 4:
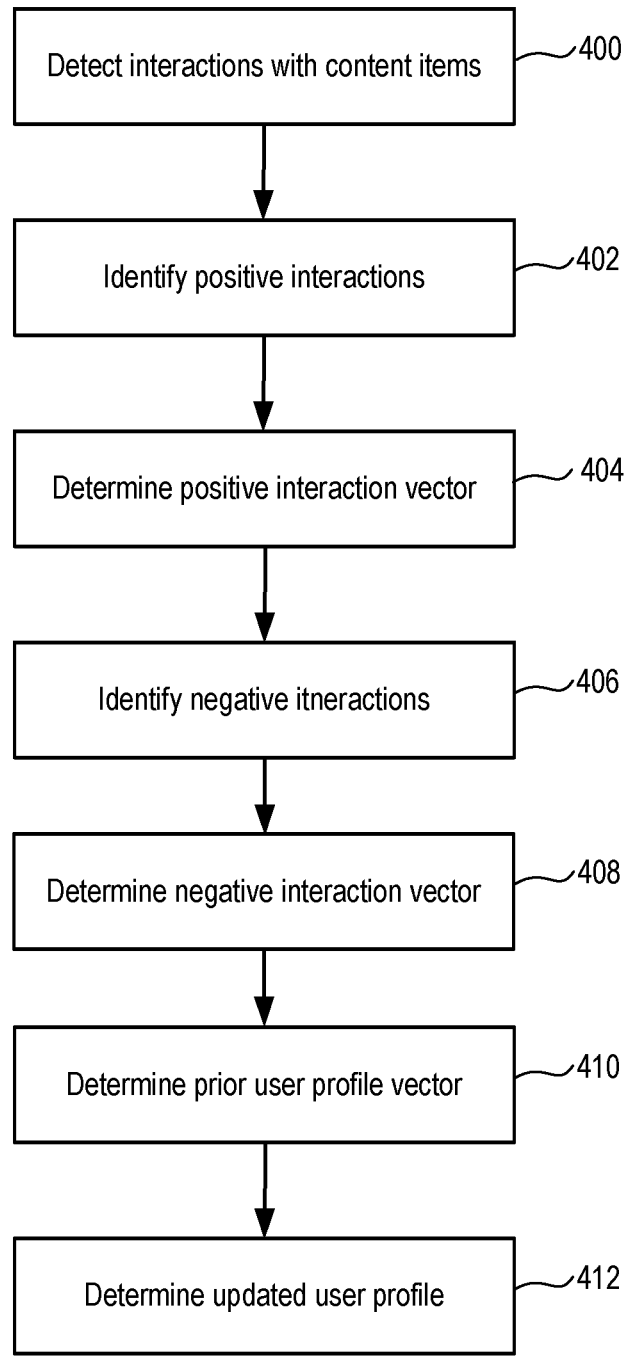
FIG. 4 illustrates a method for updating a user profile, in accordance with implementations of the disclosure.

FIG. 4 illustrates a method for updating a user profile, in accordance with implementations of the disclosure. At method operation 400, interactions by a user with content items are detected. At method operation 402, positive interactions with content items are identified, and at method operation 404, a positive interaction vector is determined from the identified positive interactions. At method operation 406, negative interactions with content items are identified, and at method operation 408, a negative interaction vector is determined from the identified negative interactions. At method operation 410, a prior user profile vector is determined, the prior user profile vector being determined from a preceding time period. At method operation 412, an updated user profile vector is determined using the prior user profile vector, the positive interaction vector, and the negative interaction vector.

Figure 5:
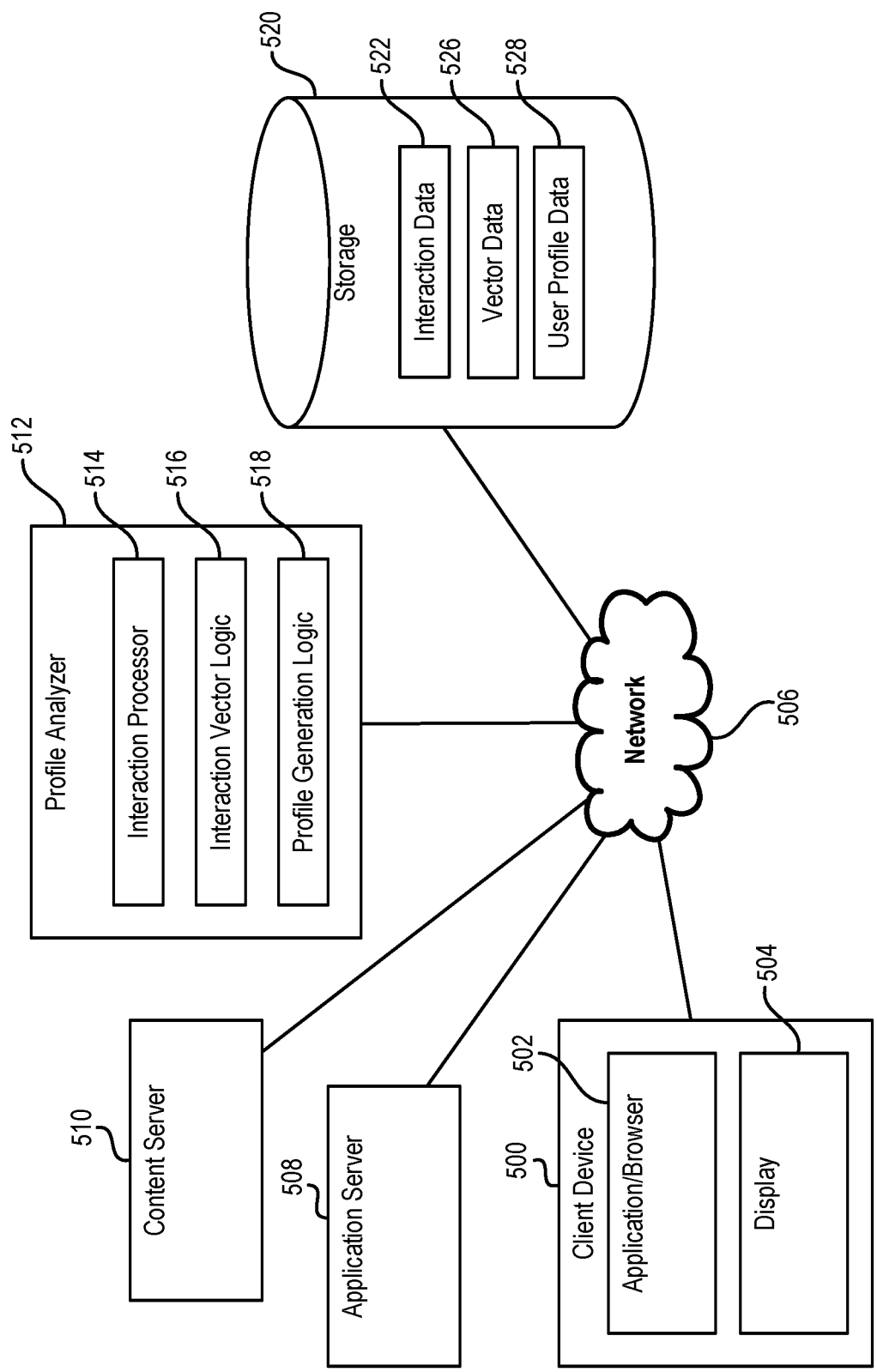
FIG. 5 illustrates a system for providing content to users based on user profiles, in accordance with implementations of the disclosure.

FIG. 5 illustrates a system for providing content to users based on user profiles, in accordance with implementations of the disclosure. Broadly speaking, the system can be configured to perform any of the methods for generating and using user profiles to provide content over a network described in accordance with implementations of the present disclosure. A client device 500 is operated by a user to access a content site or platform, which in various implementations may be a social content/networking/sharing site, an e-commerce site, a news site, forum site, blogging site, etc. The client device 500 executes an application 502 (which in some implementations, may be a browser application or a web application) that is configured to render to the display 504 of the client device 500 an interface for interacting with the content site. The application 502 may communicate over a network 506 (e.g. the Internet) with an application server 508 to obtain data so that the user may access the content site, including accessing specific content, topics/categories, a personalized feed, etc.

It will be appreciated that in some implementations, content can be obtained from a separate content server 510 for rendering in the context of the interface that is rendered on the client device 500. For example, a preview of a piece of content (e.g. an article from a $3^{rd}$ party news source) may be provided, and accessing the article may redirect to obtain the full content from the content server 510 (e.g. the $3^{rd}$ party news source's content server).

A profile analyzer 512 is configured to determine user profiles in accordance with the methods disclosed herein. The profile analyzer 512 includes interaction processor 514 that is configured to process user interactions with content, stored as interaction data 522 in a storage 520, to identify positive and negative interactions in accordance with the methods described above.

The profile analyzer 512 further includes interaction vector logic 516 that is configured to process the positive and negative interactions to determine positive and negative interaction vectors, as described above. As has been described, this may entail processing content item vectors, which are stored as vector data 526. The resulting vector representations of the positive and negative interactions can also be stored as part of vector data 526. The profile analyzer 512 further includes profile generation logic 518 that is configured to generate user profiles in accordance with implementations described above. The user profiles thus defined can be stored as user profile data 528.

It will be appreciated that the user profile data 528, can be used by the application server 508 or content server 510 to recommend content in response to a user request, such as a search query or a request to view a given webpage. In some implementations, this may entail ranking content or results based on a given user's user profile to determine the order in which such content will be presented to the user.

Figure 6:
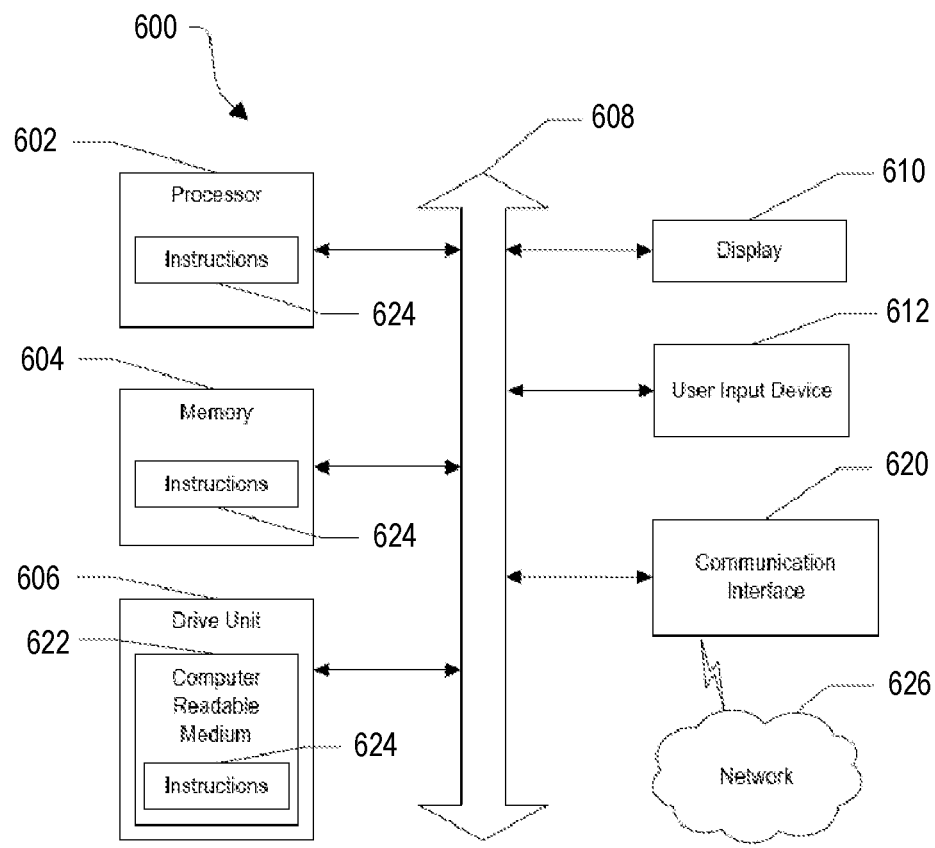
FIG. 6 illustrates an implementation of a general computer system, in accordance with an implementation of the disclosure.

FIG. 6 illustrates an implementation of a general computer system designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 600 may further include a display unit 610, such as a liquid crystal display (LCD), an organic light emitting diode (OLED), a flat panel display, a solid state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of system 600. The input device 612 may be a number pad, a keyboard, or a cursor control device, such as a mouse, or a joystick, touch screen display, remote control or any other device operative to interact with the computer system 600.

The computer system 600 may also or alternatively include a disk or optical drive unit 606. The disk drive unit 606 may include a computer-readable medium 622 in which one or more sets of instructions 624, e.g. software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 626 can communicate voice, video, audio, images or any other data over the network 626. Further, the instructions 624 may be transmitted or received over the network 626 via a communication port or interface 620, and/or using a bus 608. The communication port or interface 620 may be a part of the processor 602 or may be a separate component. The communication port 620 may be created in software or may be a physical connection in hardware. The communication port 620 may be configured to connect with a network 626, external media, the display 610, or any other components in system 600, or combinations thereof. The connection with the network 626 may be a physical connection, such as a wired Ethernet connection or may be established wirelessly as discussed below. Likewise, the additional connections with other components of the system 600 may be physical connections or may be established wirelessly. The network 626 may alternatively be directly connected to the bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to one or more networks 626. The network 626 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 626 may include wide area networks (WAN), such as the Internet, local area networks (LAN), campus area networks, metropolitan area networks, a direct connection such as through a Universal Serial Bus (USB) port, or any other networks that may allow for data communication. The network 626 may be configured to couple one computing device to another computing device to enable communication of data between the devices. The network 626 may generally be enabled to employ any form of machine-readable media for communicating information from one device to another. The network 626 may include communication methods by which information may travel between computing devices. The network 626 may be divided into sub-networks. The sub-networks may allow access to all of the other components connected thereto or the sub-networks may restrict access between the components. The network 626 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method implemented by at least one server computer, comprising:

detecting interactions by a plurality of users with content items, the content items being provided over a network in response to user requests received over the network, wherein a content item has a content item vector that defines a first value indicating a first relevance of the content item to a first entity and a second value indicating a second relevance of the content item to a second entity;

for a user, identifying interactions occurring during a current time period, including identifying positive interactions indicating engagement by the user with a first set of the content items, and identifying negative interactions indicating one or more negative reactions by the user to a second set of the content items;

processing a first set of content item vectors that are associated with the first set of the content items to determine a positive interaction vector based upon a first centroid of the first set of content item vectors;

processing a second set of content item vectors that are associated with the second set of the content items to determine a negative interaction vector based upon a second centroid of the second set of content item vectors, wherein the negative interaction vector is different than the positive interaction vector; and for the user, generating a current user profile vector for the current time period by combining the positive interaction vector, the negative interaction vector, and a prior user profile vector for a prior time period, wherein generating the current user profile vector comprises adjusting the prior user profile vector at least one of towards the first centroid or away from the second centroid;

wherein at least one of the current user profile vector or the prior user profile vector defines one or more values indicating one or more levels of interest by the user with respect to one or more entities.

2. The method of claim 1, wherein processing the first set of content item vectors to determine the positive interaction vector includes determining a mean of the first set of content item vectors;

wherein processing the second set of content item vectors to determine the negative interaction vector includes determining a mean of the second set of content item vectors.

3. The method of claim 1, wherein generating the current user profile vector includes applying weights to each of the positive interaction vector, the negative interaction vector, and the prior user profile vector.

4. The method of claim 3, wherein a weight applied to the prior user profile vector has a value less than one.

5. The method of claim 4, wherein the weight applied to the prior user profile vector defines a time decay of the prior user profile vector.

6. The method of claim 1, wherein generating the current user profile vector comprises adjusting the prior user profile vector towards the first centroid.

7. The method of claim 1, wherein generating the current user profile vector comprises adjusting the prior user profile vector away from the second centroid.

8. The method of claim 1, wherein the content items include at least one of previews, articles, videos, or images.

9. The method of claim 1, wherein the current time period is defined by an amount of time in the range of about 1 to 30 days;

wherein the prior time period is defined by an amount of time equivalent to that of the current time period, that immediately precedes the current time period.

10. The method of claim 1, wherein at least one of the first set of content item vectors, the second set of content item vectors, the positive interaction vector, the negative interaction vector, the current user profile vector or the prior user profile vector has a dimension that is defined by a number of the one or more entities.

11. The method of claim 10, wherein the number of the one or more entities is greater than one thousand entities.

12. A non-transitory computer readable medium having program instructions embodied thereon, the program instructions being configured, when executed by a computing device, to cause the computing device to perform operations comprising:

detecting interactions by a plurality of users with content items, the content items being provided over a network in response to user requests received over the network, wherein a content item has a content item vector that defines a first value indicating a first relevance of the content item to a first entity and a second value indicating a second relevance of the content item to a second entity;

for a user, identifying interactions occurring during a current time period, including identifying positive interactions indicating engagement by the user with a first set of the content items, and identifying negative interactions indicating lack of engagement by the user with a second set of the content items;

processing a first set of content item vectors that are associated with the first set of the content items to determine a positive interaction vector based upon a first centroid of the first set of content item vectors;

processing a second set of content item vectors that are associated with the second set of the content items to determine a negative interaction vector based upon a second centroid of the second set of content item vectors, wherein the negative interaction vector is different than the positive interaction vector; and for the user, generating a current user profile vector for the current time period by combining the positive interaction vector, the negative interaction vector, and a prior user profile vector for a prior time period, wherein generating the current user profile vector comprises adjusting the prior user profile vector at least one of towards the first centroid or away from the second centroid;

wherein at least one of the current user profile vector or the prior user profile vector defines one or more values indicating one or more levels of interest by the user with respect to one or more entities.

13. The non-transitory computer readable medium of claim 12, wherein processing the first set of content item vectors to determine the positive interaction vector includes determining a mean of the first set of content item vectors;

wherein processing the second set of content item vectors to determine the negative interaction vector includes determining a mean of the second set of content item vectors.

14. The non-transitory computer readable medium of claim 12, wherein generating the current user profile vector includes applying weights to each of the positive interaction vector, the negative interaction vector, and the prior user profile vector.

15. The non-transitory computer readable medium of claim 14, wherein a weight applied to the prior user profile vector has a value less than one, and wherein the weight applied to the prior user profile vector defines a time decay of the prior user profile vector.

16. The non-transitory computer readable medium of claim 12, wherein generating the current user profile vector comprises adjusting the prior user profile vector towards the first centroid and away from the second centroid.

17. The non-transitory computer readable medium of claim 12, wherein the content items include at least one of previews, articles, videos, or images.

18. The non-transitory computer readable medium of claim 12, wherein the current time period is defined by an amount of time in the range of about 1 to 30 days;
wherein the prior time period is defined by an amount of time equivalent to that of the current time period, that immediately precedes the current time period.

19. The non-transitory computer readable medium of claim 12, wherein at least one of the first set of content item vectors, the second set of content item vectors, the positive interaction vector, the negative interaction vector, the current user profile vector or the prior user profile vector has a dimension that is defined by a number of the one or more entities, and wherein the number of the one or more entities is greater than one thousand entities.

20. A system comprising:
a processor; and
memory comprising processor-executable instructions that when executed by the processor cause performance of operations, the operations comprising:
detecting interactions by a plurality of users with content items, the content items being provided over a network in response to user requests received over the network, wherein a content item has a content item vector that defines a first value indicating a first relevance of the content item to a first entity and a second value indicating a second relevance of the content item to a second entity;
for a user, identifying interactions occurring during a current time period, including identifying positive interactions indicating engagement by the user with a first set of the content items, and identifying negative interactions indicating one or more negative reactions by the user to a second set of the content items;
processing a first set of content item vectors that are associated with the first set of the content items to determine a positive interaction vector based upon a first centroid of the first set of content item vectors;
processing a second set of content item vectors that are associated with the second set of the content items to determine a negative interaction vector based upon a second centroid of the second set of content item vectors; and
for the user, generating a current user profile vector for the current time period by combining the positive interaction vector, the negative interaction vector, and a prior user profile vector for a prior time period, wherein generating the current user profile vector comprises adjusting the prior user profile vector at least one of towards the first centroid or away from the second centroid.

\* \* \* \* \*